(12) United States Patent
Garza

(10) Patent No.: US 6,997,823 B2
(45) Date of Patent: Feb. 14, 2006

(54) GOLF GREEN READER

(76) Inventor: Francisco Garza, 414 Country View La., Garland, TX (US) 75043

( * ) Notice: Subject to any disclaimer, the term of this patent is extended or adjusted under 35 U.S.C. 154(b) by 0 days.

(21) Appl. No.: 10/922,095

(22) Filed: Aug. 19, 2004

(65) Prior Publication Data

US 2005/0043120 A1    Feb. 24, 2005

Related U.S. Application Data

(60) Provisional application No. 60/497,035, filed on Aug. 22, 2003.

(51) Int. Cl.
*A63B 57/00* (2006.01)
(52) U.S. Cl. ....................... 473/407; 473/404
(58) Field of Classification Search ........... 473/404, 473/407; 33/379, 377, 389
See application file for complete search history.

(56) References Cited

U.S. PATENT DOCUMENTS 2,465,428 A * 3/1949 Brown ................. 359/882
4,063,731 A * 12/1977 Kitay ................... 473/407
4,258,475 A * 3/1981 Buckley ................. 473/407
4,260,151 A * 4/1981 Weaver ................. 473/404
5,330,179 A * 7/1994 Hampel ................. 473/404
5,492,322 A * 2/1996 Smith ................... 473/404

* cited by examiner

*Primary Examiner*—Steven Wong
(74) *Attorney, Agent, or Firm*—Michael A. O'Neil

(57) ABSTRACT

A golf green reader includes a lens comprising a plurality of spaced, parallel lines and a line extending perpendicularly to the spaced, parallel lines. When the perpendicularly extending line is aligned with a golf ball resting on a golf green and the pin of the golf green, the spaced, parallel lines are used to read the slope or inclination of the golf green. The golf green reader includes a level for aligning the spaced, parallel lines horizontally and a handle for aligning the perpendicularly extending line with the golf ball and cup. The lens of the golf green reader further includes vertically spaced indicia useful in determining the distance within 150 yards to the pin of a golf green. A lanyard precisely positions the golf green reader relative to user thereof to facilitate an accurate reading of the distance of the pin.

2 Claims, 4 Drawing Sheets

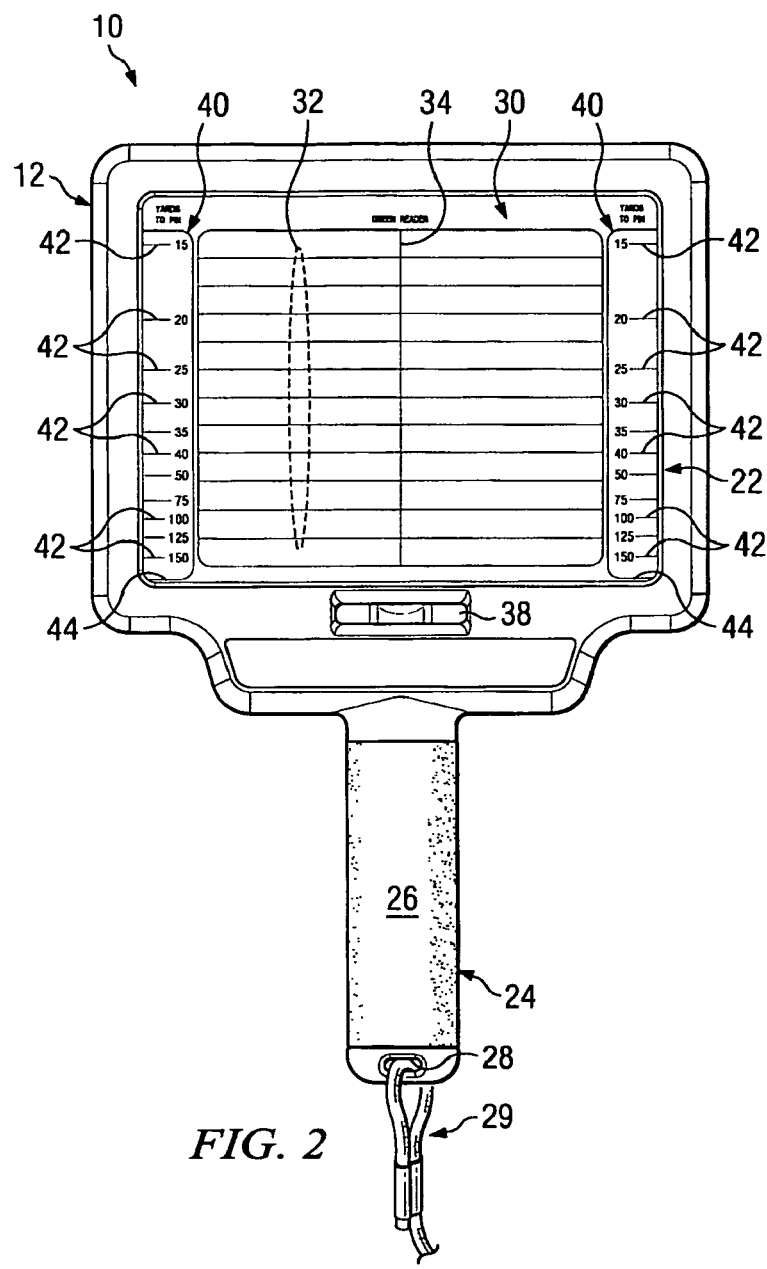
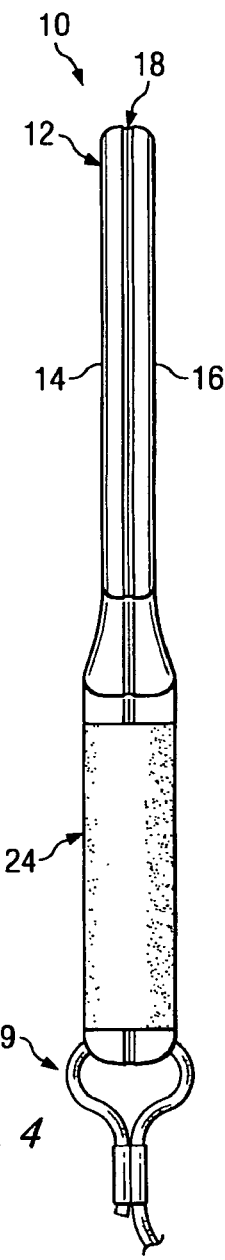
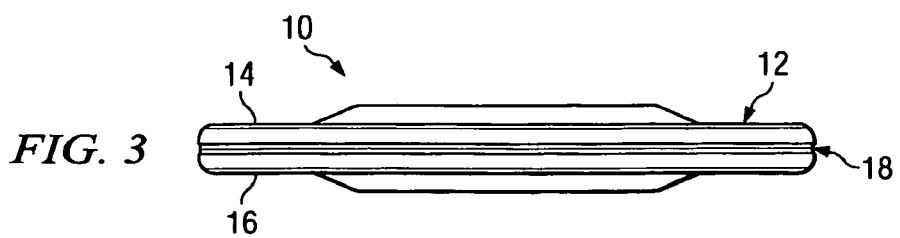
FIG. 2
FIG. 4
FIG. 3

GOLF GREEN READER

CROSS-REFRENCE TO RELATED APPLICATION

This application claims priority of prior provisional Application Ser. No. 60/497,035 filed Aug. 22, 2003.

TECHNICAL FIELD

This invention relates generally to the game of golf, and more particularly to an apparatus which facilitates a determination of the slope or angle of a golf green, and which facilitates a determination of the distance from a golfer to the flag or pin of a golf green.

BACKGROUND AND SUMMARY OF THE INVENTION

As is well known, the game of golf includes numerous challenges to the golfer. One of the perplexing challenges that a golfer must address is that of "reading" a golf green, that is, determining the angle or inclination of the golf green. An accurate reading of each golf green encountered during the play of a round of golf is necessary so that the golfer can putt his or her golf ball in a direction such that the golf ball will roll toward and into the cup of the golf green.

Another problem encountered by golfers is that of determining the distance from the present location of the golfer's ball to the flag or pin which identifies the cup of the golf green that the golfer needs to attain or reach. As will be apparent, an accurate determination of the distance from the present location of the golf ball to the pin is essential in order for the golfer to select the golf club that is appropriate to the required distance.

Heretofore the ability to accurately read a golf green and the ability to accurately judge the distance between the present location of the golf ball and the pin of the next green on the golf course has only been acquired with years of practice. Thus, although professional golfers and amateur golfers with years of experience can readily read golf greens and determine pin distances, occasional golfers and newcomers to the sport are typically lacking in such skills. Thus, a need exists for a device that assists golfers in reading golf greens and determining pin distances.

The present invention comprises a golf green reader which overcomes the foregoing and other problems which have long since characterized the prior art. In accordance with the broader aspects of the invention a golf green reader comprises a frame which supports a transparent lens. The lens has inscribed or printed thereon a series of spaced, parallel horizontal lines and a vertical line. The golf green reader is also provided with a level which assures that the lines of the lens are precisely horizontal when the golf green reader is in use.

In the use of the golf green reader the level is used to assure that the horizontal lines on the lens are horizontal. The golfer then observes his or her golf ball and the golf green through the lens. To the extent possible the observation of the golf ball and the golf green is made with the perpendicular line of the lens aligned with the cup of the golf green. In this manner the golfer is readily able to determine the slope or angle of the golf green whereby putting of the golf ball in the direction necessary to cause it to roll into the cup of the golf green assured.

The golf green reader of the present invention further includes indicia located on the opposite sides of the lens. Thus, when the golfer observes a pin or flag having a conventional 7 foot height that is positioned in the cup of the golf green that he or she is approaching and aligns the bottom line of the pin or flag with the bottom of the lens of the green reader, the indicia at the side of the lens which is aligned with the top of the pin or flag provides an accurate determination of the distance between the golfer and his or her golf ball and the flag of the golf green within 150 yards. A lanyard positions the golf green reader relative to the golfer thereby assuring an accurate reading of the distance to the pin.

BRIEF DESCRIPTION OF THE DRAWINGS

A more complete understanding of the present invention may be had by reference to the following Detailed Description when taken in connection with the accompanying Drawings, wherein:

FIG. 2 is a front view of the golf green reader;

FIG. 3 is a top view of the golf green reader;

FIG. 4 is a side view of the golf green reader; and

DETAILED DESCRIPTION

Figure 1:
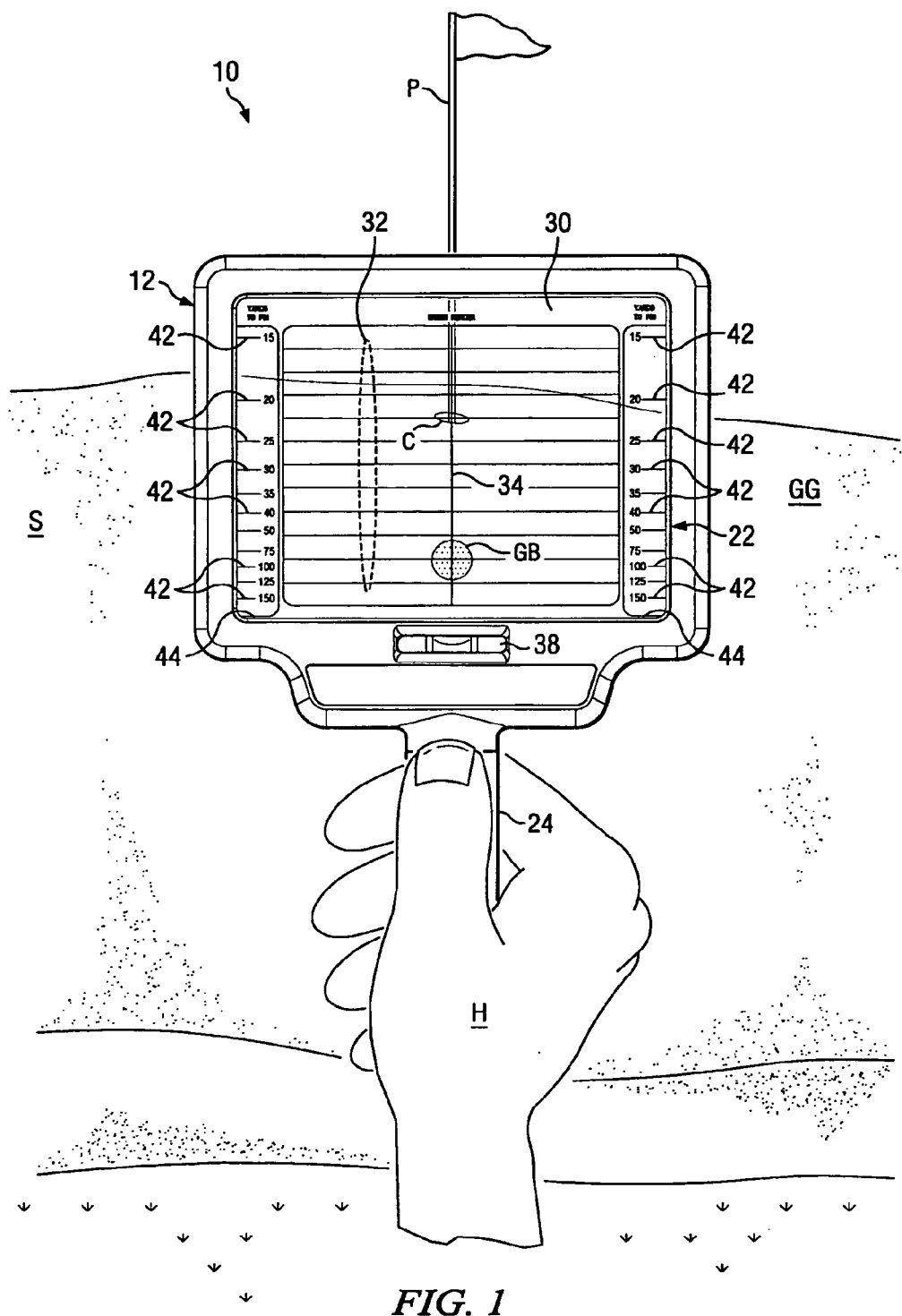
FIG. 1 is a diagrammatic illustration of the use of the golf green reader of the present invention.
Figure 5:
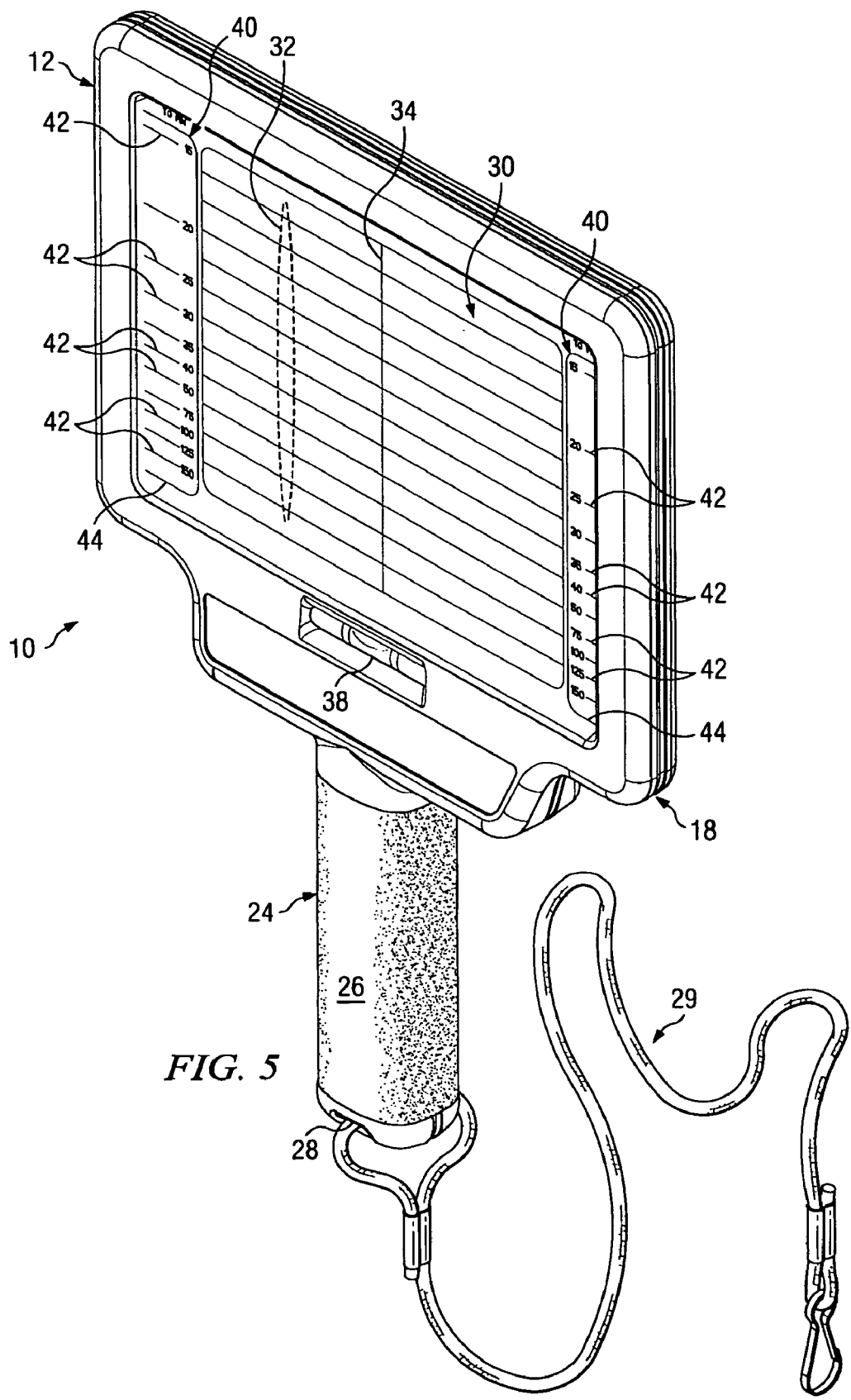
FIG. 5 is a perspective view of the golf green reader of the present invention.

Referring to the drawings, there is shown a golf green reader 10 comprising the present invention. The golf green reader 10 includes a frame 12 which may be formed from various plastic materials of the type utilized in the manufacture of consumer items, for example, polyethylene, polystyrene, acrylic, etc. If the frame 12 is formed from a selected plastic material, it is manufactured utilizing conventional plastic manufacturing techniques, such as injection molding, vacuum molding, etc. The frame 12 may also be manufactured from various metals including steel, aluminum, etc. If the frame 12 is manufactured from a selected metal, conventional metal manufacturing technique such as stamping, die cutting, etc. are utilized in the manufacture of the frame 12.

Referring particularly to FIGS. 3 and 4, the frame 12 may be comprised of opposed halves 14 and 16 which are substantially mirror images of one another. The halves 14 and 16 may be joined to form the frame 12 either by means of suitable adhesives or by means of suitable fasteners. Alternatively, the halves 14 and 16 may comprise interlocking connecting members which join the halves 14 and 16 one to another to form the frame 12.

Referring to FIG. 2, the frame 12 includes a rectangular upper portion 22 and a handle 24 extending downwardly therefrom. The handle 24 may be provided with a cover 26 which may be formed from natural or synthetic materials and which may be secured and placed by means of suitable adhesives. The function of the cover 26 is to assure that the handle 24 will be comfortably and securely gripped in the hand of a user of the green reader 10. An eyelet 28 may be provided at the bottom of the handle 24. The eyelet 28 receives a lanyard 29 which is utilized to position the green reader 10 to the user thereof. The lanyard is 22 inches long to give an accurate yardage reading.

The rectangular upper portion 22 of the frame 12 has a transparent lens 30 secured therein. The lens 30 is secured between halves 14 and 16 comprising the frame 12 and is formed from a transparent material such as glass or a suitable transparent plastic material. The lens 30 is provided with a plurality of spaced, parallel horizontal lines 32 which may be inscribed into the material of the lens 30, for example, by scoring, silk screening, or etching. Alternatively, the lines 32 may be printed on a surface of the lens 30. The lens 30 is further provided with a vertical line 34 which, like the horizontal lines 32, may be scored or etched into the material comprising the 30, or printed thereon.

A level 38 is mounted in the frame 12 below the lens 30 and above the handle 24. The level 38 is conventional in construction and is secured in the frame 12 either by clamp fitting or by means of a suitable adhesive. The function of the level 38 is to assure that the lines 32 are oriented horizontally and that the line 34 is oriented vertically during utilization of the green reader 10.

Figure 6:
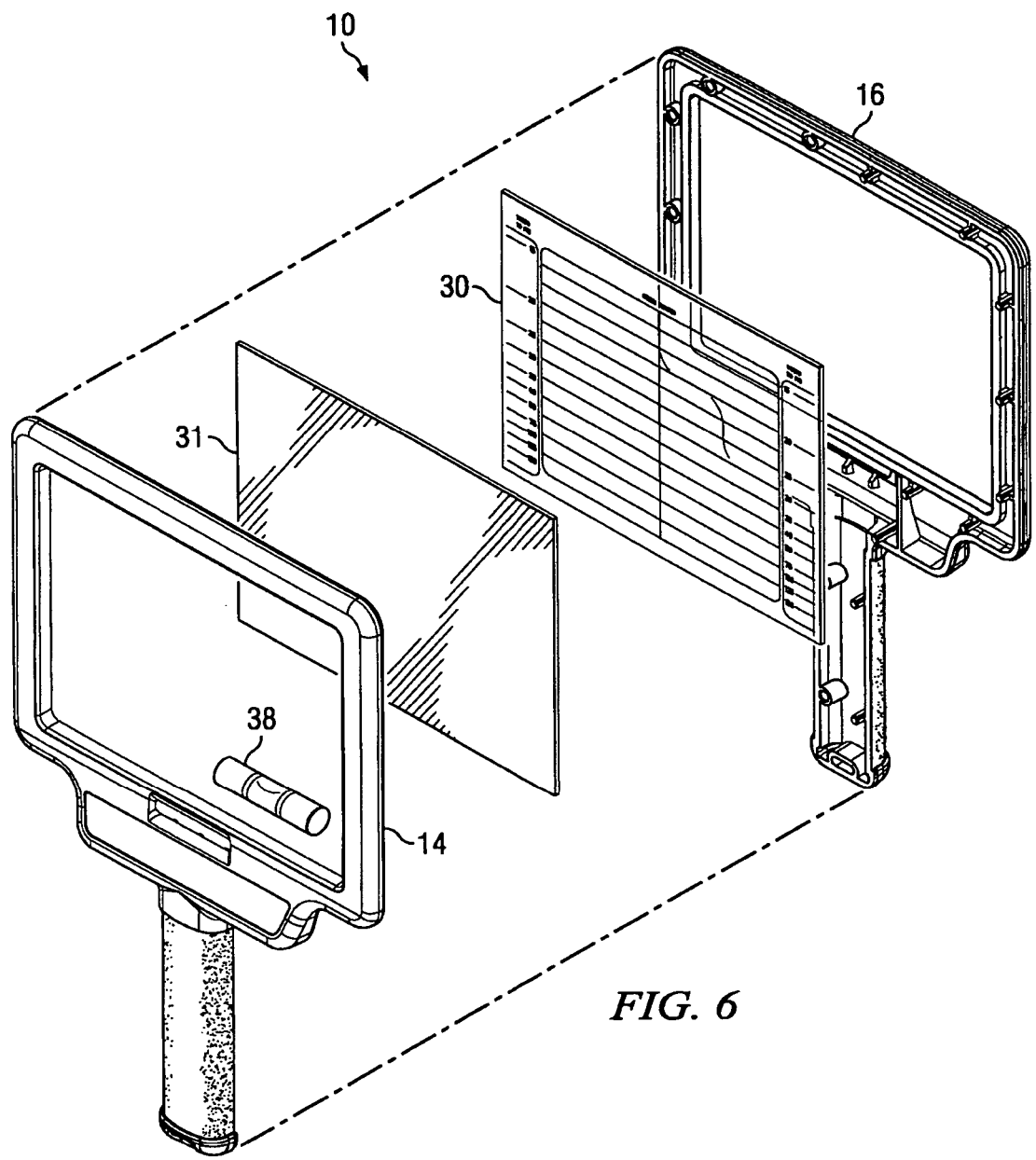
FIG. 6 is an exploded view of the golf green reader of the present invention.

The construction of the golf green reader 10 is further illustrated in FIG. 6. As will be apparent by reference thereto, the lens 30 is secured between the halves 14 and 16 comprising the frame of the golf green reader 10. The lens 30 may be provided with a protective cover 31. If used, the protective cover is formed from a transparent material such as glass or a suitable plastic.

The utilization of the golf green reader 10 in reading, i.e., determining the slope or angle of the surface of a golf green, is illustrated in FIG. 1. A golf green GG has a surface S which is provided with a cup C. The cup C is typically formed from a suitable metal or plastic and is deployed in a hole extending through the surface S and into the underlying structure of the golf green GG. A flag or pin P is deployed in the cup C for the purpose of advising golfers as to the location thereof relative to the remainder of golf green GG.

As is well known to those skilled in the art, the object of a golfer playing a golf course including the golf green GG is to putt his or her golf ball GB in such a manner that the golf ball will roll over the surface S of the golf green GG and into the cup C thereof. The function of the golf green reader 10 is to assist the golfer in reading the slope or inclination of the surface S of the golf green GG whereby the golfer can more easily determine the path that the golf ball GB must follow in order that it will roll into the cup C.

FIG. 1 illustrates the golf green reader 10 of the present invention secured in the hand H of a golfer. The level 38 of the golf green reader 10 is utilized to assure that the lines 32 of the lens 30 are disposed horizontally and that the line 34 thereof is disposed vertically. As will be evident from FIG. 1, the vertical line 34 is aligned with the golf ball GB and with the pin or flag P. When the vertical line 34 is aligned with the golf ball GB and with the pin P, the horizontal lines 32 are utilized by the golfer to determine the slope or inclination of the surfaces of the golf green GG. In a particular circumstance illustrated in FIG. 1, the surface S of the golf green GG slopes downwardly from left to right. Therefore, the golfer utilizing the golf green reader 10 knows that the golf ball GB must be putted along the line extending to the left of the cup C. This is because, as the golfer knows, although the golf ball GB initially travels on a path extending to the left of the cup C, because of the slope or inclination of the surface of the golf green GG, gravity will cause the golf ball GB to veer rightwardly from its initial path and into the cup C.

Referring again to FIG. 2, the green reader 10 further includes a pair of distance measuring devices 40. The distance measuring devices 40 comprise part of the lens 30 and are located at the left hand and right hand edges hereof.

The distance measuring devices 40 comprise a plurality of lines 42 which may be inscribed, i.e., scored or etched into the material of the lens 30, or printed thereon, for example by silk screening. Each of the lines 42 has a distance indicia located at the inside edge thereof. Like the lines 42, the distance indicia may be scored or etched into the surface of the lens 30 or printed on the surface thereof.

The distance measuring devices 40 are utilized by aligning a line 44 with the bottom of a pin or flag that is positioned in the cup of a green that the golfer is attempting to reach or attain. Having aligned the line 44 of the distance measuring device 40 with the bottom of the pin, the golfer next determines which of the lines 42 thereof is the most nearly aligned with the top of the pin. Having associated one of the lines 42 with the top of the pin, the golfer determines the distance (within 150 yards) from his or her present location to the pin by reference to the distance indicia located at the inside edge of the selected line 42. As will be readily understood by those skilled in the art, by knowing the distance between a golfer's present location and the pin of the golf green that he or she is attempting to reach or attain, selection of the appropriate golf club is greatly facilitated.

As will therefore be understood, the present invention comprises a golf green reader having a transparent lens which is provided with a vertical line and a plurality of horizontal lines that are used to determine the slope or inclination of a golf green. The lens also includes at least one distance measuring device which is used to determine the distance within 150 yards between a golfer and the pin or flag of a golf green.

Although preferred embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

What is claimed is:

1. A golf green reader comprising:
   a transparent lens;
   a plurality of substantially equally spaced apart, substantially parallel lines formed on the transparent lens;
   at least one additional line extending substantially perpendicularly to the spaced, parallel lines;
   means for orienting the spaced, parallel lines horizontally;
   means for aligning the perpendicularly extending line with a golf ball situated on a golf green and with a pin extending upwardly from a golf ball receiving cup mounted in the golf green;
   the spaced, parallel lines for thereafter assisting a golfer at reading the inclination of the surface of the golf green relative to the horizontal;
   wherein the transparent lens further includes means for determining the distance between the transparent lens and the pin of a golf green.

2. A golf green reader comprising:
   a transparent lens;
   a plurality of substantially equally spaced part, substantially parallel lines formed on the transparent lens;
   at least one additional line extending substantially perpendicularly to the spaced, parallel lines;
   means for orienting the spaced, parallel lines horizontally;
   means for aligning the perpendicularly extending line with a golf ball situated on a golf green and with a pin extending upwardly from a golf ball receiving cup mounted in the golf green;
   the spaced, parallel lines for thereafter assisting a golfer at reading the inclination of the surface of the golf green relative to the horizontal;
   a frame having an aperture extending therethrough;
   wherein the lens is mounted in the aperture of the frame; and
   wherein the transparent lens further includes means for determining the distance between the transparent lens and the pin of a golf green.

\* \* \* \* \*